(12) United States Patent
Kaunas et al.

(10) Patent No.: US 11,791,761 B2
(45) Date of Patent: Oct. 17, 2023

(54) PHOTOVOLTAIC PANEL CABLE MOUNT ARRANGEMENT

(71) Applicant: PREFORMED LINE PRODUCTS CO., Mayfield Village, OH (US)

(72) Inventors: Darius Kaunas, Medina, OH (US); John B. Markiewicz, Mentor, OH (US)

(73) Assignee: PREFORMED LINE PRODUCTS CO., Mayfield Village, OH (US)

( * ) Notice: Subject to any disclaimer, the term of this patent is extended or adjusted under 35 U.S.C. 154(b) by 0 days.

(21) Appl. No.: 17/554,175

(22) Filed: Dec. 17, 2021

(65) Prior Publication Data

US 2022/0200514 A1 Jun. 23, 2022

Related U.S. Application Data

(60) Provisional application No. 63/127,525, filed on Dec. 18, 2020, provisional application No. 63/127,509, filed on Dec. 18, 2020, provisional application No. 63/127,498, filed on Dec. 18, 2020.

(51) Int. Cl.
| | |
|---|---|
| *H02S 20/00* | (2014.01) |
| *H02S 20/10* | (2014.01) |
| *F16B 5/02* | (2006.01) |
| *F16B 43/02* | (2006.01) |

(Continued)

(52) U.S. Cl.
CPC .............. *H02S 20/10* (2014.12); *F16B 5/025* (2013.01); *F16B 43/02* (2013.01); *F16G 11/12* (2013.01); *F24S 25/50* (2018.05)

(58) Field of Classification Search
None
See application file for complete search history.

(56) References Cited

U.S. PATENT DOCUMENTS

| | | |
|---|---|---|
| 3,438,300 A | 4/1969 | Blom et al. |
| 4,832,001 A | 5/1989 | Baer |
| 8,448,390 B1 | 5/2013 | Clemens |

(Continued)

FOREIGN PATENT DOCUMENTS

| | | |
|---|---|---|
| DE | 3613692 A1 | 11/1987 |
| DE | 10116782 A1 | 10/2002 |

(Continued)

*Primary Examiner* — Steven M Marsh
(74) *Attorney, Agent, or Firm* — COOPER LEGAL GROUP, LLC

(57) ABSTRACT

A mount system for a supporting a plurality of photovoltaic panels includes a plurality of stanchions. Each stanchion is spaced apart from other stanchions in a linear stanchion array having first and second ends. Each stanchion includes a vertical member and a transverse member supported by the vertical member. The transverse member has a plurality of support points. The system includes a plurality of anchor arrangements. A first anchor arrangement is located proximate the first end and a second anchor arrangement is located proximate the second end. The system includes a plurality of cables. Each cable is under tension and extends between the first and second anchor arrangements. Each cables extends to engage and is supported by a support point on a transverse member. The system includes a plurality of photovoltaic panel attachments. Each photovoltaic panel attachment is secured to a point on a photovoltaic panel and to a cable.

20 Claims, 7 Drawing Sheets

(51) Int. Cl.
    *F16G 11/12*        (2006.01)
    *F24S 25/50*        (2018.01)

(56)            References Cited

U.S. PATENT DOCUMENTS

| | | | |
|---|---|---|---|
| 8,627,617 B2 | 1/2014 | Haddock | |
| 8,650,812 B2 * | 2/2014 | Cusson | H02S 20/10 |
| | | | 126/621 |
| 8,661,747 B2 * | 3/2014 | Eide | F24S 25/12 |
| | | | 126/621 |
| 9,157,664 B2 * | 10/2015 | Place | F24S 25/10 |
| 9,641,123 B2 * | 5/2017 | Swahn | F24S 25/11 |
| 10,615,738 B2 * | 4/2020 | Sgarrella | E02D 5/223 |
| 10,670,303 B2 * | 6/2020 | West | H02S 20/32 |
| 11,251,743 B2 * | 2/2022 | Schuit | H02S 20/30 |
| 2010/0000516 A1 | 1/2010 | Conger | |
| 2011/0155218 A1 | 6/2011 | Buechel et al. | |
| 2012/0017526 A1 * | 1/2012 | Eide | H02S 20/00 |
| | | | 52/173.3 |

FOREIGN PATENT DOCUMENTS

| | | |
|---|---|---|
| DE | 10219106 A1 | 11/2003 |
| DE | 102008057388 A1 | 5/2010 |
| KR | 101004108 B1 | 12/2010 |
| WO | 2012045129 A2 | 4/2012 |
| WO | 2014129800 A1 | 8/2014 |
| WO | 2014175803 A1 | 10/2014 |
| WO | 2017173955 A1 | 10/2017 |
| WO | 2019203710 A1 | 10/2019 |

* cited by examiner

PHOTOVOLTAIC PANEL CABLE MOUNT ARRANGEMENT

RELATED APPLICATIONS

Benefit is claimed from U.S. Patent Application No. 63/127,498, filed Dec. 18, 2020, U.S. Patent Application No. 63/127,509, filed Dec. 18, 2020 and U.S. Patent Application No. 63/127,525, filed Dec. 18, 2020, the entire contents and disclosures of these applications are incorporated, in entirety, herein by reference.

FIELD

The present disclosure is a patent application and relates generally to support of photovoltaic panels, and associated structures and methods, and within a specific example relates to a system utilizing tensioned cables.

BACKGROUND

Photovoltaic, solar panels are a good alternative source of electrical energy. Often plural photovoltaic panels are used within an array to provide a greater amount of overall output.

Often, plural photovoltaic panels are mounted upon a mounting structure to provide a desired mounted orientation, space the panels away from a ground (e.g., earth or other man-made structure such as a building), etc. Often, such mounting structure is made of rigid metal (e.g., aluminum or steel) constructed pieces. Such rigid metal mounting structures may have relatively high material costs and have high time/labor construction needs. Accordingly, it would be beneficial to have an alternative that mitigates such relatively high material costs and such high time/labor construction needs.

BRIEF SUMMARY

The following presents a simplified example summary in order to provide a basic understanding of some aspects of the present disclosure. This summary is not an extensive overview of the present disclosure. It is intended to neither identify key or critical elements nor delineate the scope of the present disclosure. Its sole purpose is to present some concepts of the present disclosure in a simplified form as a prelude to the more detailed description that is presented later.

In accordance with at least some aspects, the present disclosure provides a mount system for a supporting a plurality of photovoltaic panels above a ground. The mount system includes a plurality of stanchions. Each stanchion of the plurality of stanchions is spaced apart from other stanchions of the plurality of stanchions in a linear stanchion array having a first linear stanchion array end and a second linear stanchion array end and with spacing between a pair of stanchions of the plurality of stanchions permitting multiple photovoltaic panels of the plurality of photovoltaic panels to be located between the pair of the stanchions. Each stanchion includes a vertical member extending away from the ground, and a transverse member supported by the vertical member above the ground and extending non-parallel to an extent of the vertical member. The transverse member having a plurality of support points. The mount system includes a plurality of anchor arrangements fixed relative to the ground. A first anchor arrangement of the plurality of anchor arrangements is located proximate to the first linear stanchion array end and a second anchor arrangement of the plurality of anchor arrangements is located proximate to the second linear stanchion array end. The mount system includes a plurality of cables. Each cable of the plurality of cables is under tension and extends between the first anchor arrangement and the second anchor arrangement. A cable of the plurality of cables extends to engage a support point of the plurality of support points on the transverse member of a stanchion of the plurality of stanchions and is supported by the transverse member of the stanchion of the plurality of stanchions. The mount system includes a plurality of photovoltaic panel attachments. A first photovoltaic panel attachment of the plurality of photovoltaic panel attachments is secured to a first photovoltaic panel of the plurality of photovoltaic panels and is secured to a first cable of the plurality of cables and a second photovoltaic panel attachment of the plurality of photovoltaic panel attachments secured to the first photovoltaic panel of the plurality of photovoltaic panels and secured to a second cable of the plurality of cables to support the first photovoltaic panel within an array of photovoltaic panels supported by the plurality of cables.

In accordance with at least some aspects, the present disclosure provides a photovoltaic panel array arrangement includes a plurality of photovoltaic panels and a mount system. The mount system supports the plurality of photovoltaic panels above a ground. The mount system includes a plurality of stanchions. Each stanchion of the plurality of stanchions is spaced apart from other stanchions of the plurality of stanchions in a linear stanchion array having a first linear stanchion array end and a second linear stanchion array end and with spacing between a pair of stanchions of the plurality of stanchions permitting multiple photovoltaic panels of the plurality of photovoltaic panels to be located between the pair of the stanchions. Each stanchion includes a vertical member extending away from the ground, and a transverse member supported by the vertical member above the ground and extending non-parallel to an extent of the vertical member. The transverse member having a plurality of support points. The mount system includes a plurality of anchor arrangements fixed relative to the ground. A first anchor arrangement of the plurality of anchor arrangements is located proximate to the first linear stanchion array end and a second anchor arrangement of the plurality of anchor arrangements is located proximate to the second linear stanchion array end. The mount system includes a plurality of cables. Each cable of the plurality of cables is under tension and extends between the first anchor arrangement and the second anchor arrangement. A cable of the plurality of cables extends to engage a support point of the plurality of support points on the transverse member of a stanchion of the plurality of stanchions and is supported by the transverse member of the stanchion of the plurality of stanchions. The mount system includes a plurality of photovoltaic panel attachments. A first photovoltaic panel attachment of the plurality of photovoltaic panel attachments is secured to a first photovoltaic panel of the plurality of photovoltaic panels and is secured to a first cable of the plurality of cables and a second photovoltaic panel attachment of the plurality of photovoltaic panel attachments secured to the first photovoltaic panel of the plurality of photovoltaic panels and secured to a second cable of the plurality of cables to support the first photovoltaic panel within an array of photovoltaic panels supported by the plurality of cables.

In accordance with at least some aspects, the present disclosure provides a method for a supporting a plurality of photovoltaic panels above a ground. The method includes providing a plurality of stanchions with each stanchion of the plurality of stanchions being spaced apart from other stanchions of the plurality of stanchions in a linear stanchion array having a first linear stanchion array end and a second linear stanchion array end and with spacing between a pair of stanchions of the plurality of stanchions permitting multiple photovoltaic panels of the plurality of photovoltaic panels to be located between the pair of the stanchions. The method includes providing each stanchion to include a vertical member extending away from the ground, and a transverse member supported by the vertical member above the ground and extending non-parallel to an extent of the vertical member, with the transverse member having a plurality of support points. The method includes providing a plurality of anchor arrangements fixed relative to the ground with a first anchor arrangement of the plurality of anchor arrangements being located proximate to the first linear stanchion array end and a second anchor arrangement of the plurality of anchor arrangements being located proximate to the second linear stanchion array end. The method includes providing a plurality of cables with each cable of the plurality of cables being under tension and extending between the first anchor arrangement and the second anchor arrangement, and with a cable of the plurality of cables extending to engage a support point of the plurality of support points on the transverse member of a stanchion of the plurality of stanchions and being supported by the transverse member of the stanchion of the plurality of stanchions. The method includes providing a plurality of photovoltaic panel attachments with a first photovoltaic panel attachment of the plurality of photovoltaic panel attachments secured to a first photovoltaic panel of the plurality of photovoltaic panels and secured to a first cable of the plurality of cables and a second photovoltaic panel attachment of the plurality of photovoltaic panel attachments secured to the first photovoltaic panel of the plurality of photovoltaic panels and secured to a second cable of the plurality of cables to support the first photovoltaic panel within an array of photovoltaic panels supported by the plurality of cables.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Figure 1:
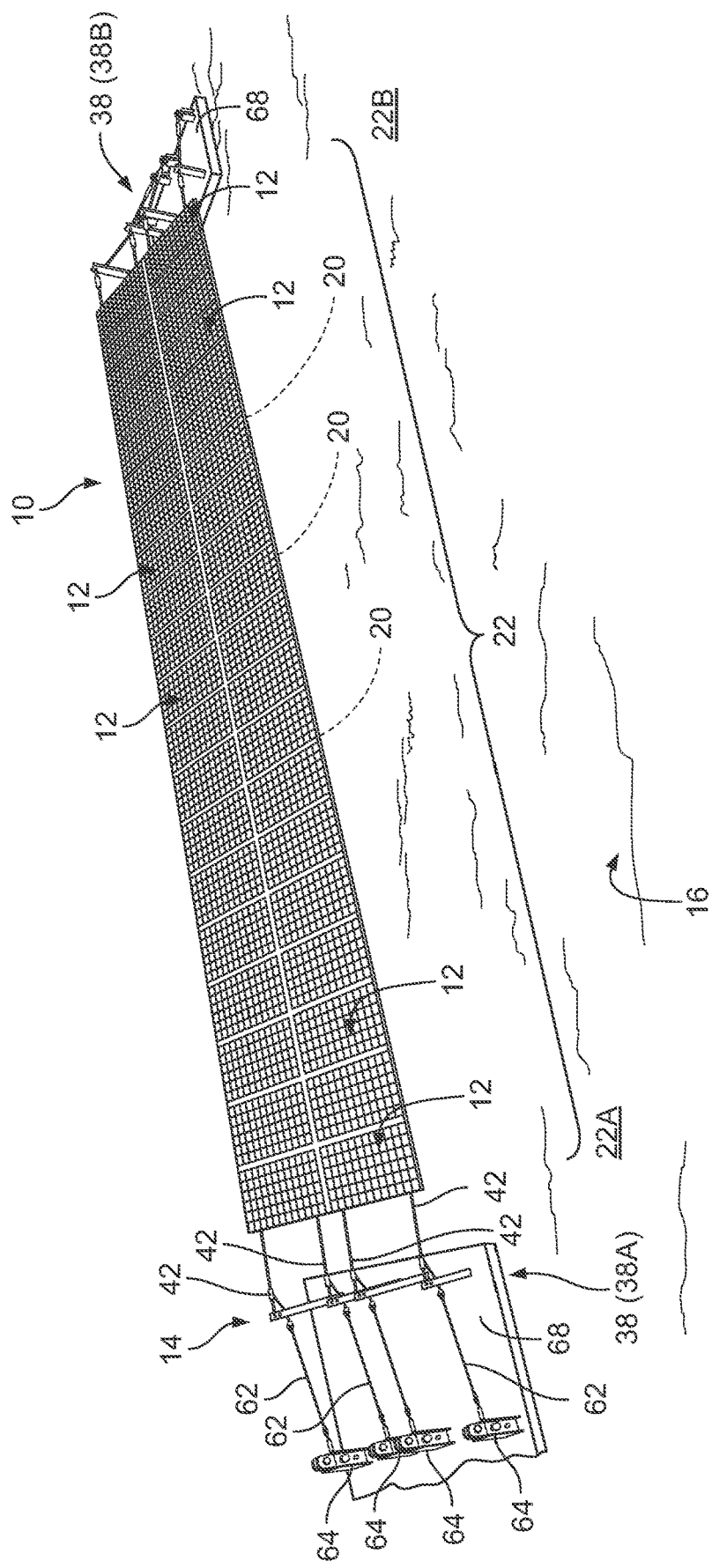
FIG. 1 is a perspective view of an example photovoltaic panel array system in accordance with the present disclosure.

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

Certain terminology is used herein for convenience only and is not to be taken as a limitation on the disclosed subject matter. Relative language used herein is best understood with reference to the drawings, in which like numerals are used to identify like or similar items. Further, in the drawings, certain features may be shown in somewhat schematic form.

The following subject matter may be embodied in a variety of different forms, such as methods, devices, components, and/or systems. Accordingly, this subject matter is not intended to be construed as limited to any illustrative embodiments set forth herein as examples. Rather, the embodiments are provided herein merely to be illustrative.

Provided herein are examples of a mount system for supporting a plurality of photovoltaic panels above a ground, and examples of a photovoltaic panel array arrangement that includes such a mount system. Also provided herein are example methods of providing and using such.

Within an example and in accordance with an aspect, the present disclosure provides a mount system for a supporting a plurality of photovoltaic panels above a ground. The system includes a plurality of stanchions. Each of the stanchions is spaced apart from the other of the stanchions in a linear stanchion array having first and second linear stanchion array ends and with the spacing between each pair of the stanchions permitting multiple photovoltaic panels to be located between the respective pair of the stanchions. Each stanchion includes a vertical member extending away from the ground, and a transverse member supported by the vertical member above the ground and extending transverse to the extent of the vertical member. The transverse member has a plurality of support points. The system includes a plurality of anchor arrangements fixed relative to the ground. A first anchor arrangement being located proximate to the first linear stanchion array end and a second anchor arrangement being located proximate to the second stanchions array end. The system includes a plurality of cables. Each cable is under tension and extends between the first anchor arrangement and the second anchor arrangement. Each of the cables extends to engage a respective support point on the transverse member of each of the plurality of stanchions and is supported by the transverse member of each of the plurality of stanchions. The system includes a plurality of photovoltaic panel attachments. Each photovoltaic panel attachment is secured to a point on a respective one of the photovoltaic panels and secured to a respective one of the cables. A multiple of the photovoltaic panel attachments are secured to each photovoltaic panel and the multiple of the photovoltaic panel attachments are distributed to be secured to multiple of the cables. Each respective photovoltaic panel is retained within an array of the photovoltaic panels extending along the cables.

Within an example and in accordance with an aspect, the present disclosure provides a photovoltaic panel array arrangement that includes a plurality of photovoltaic panels and the mount system for a supporting the plurality of photovoltaic panels above a ground.

An example photovoltaic panel array arrangement 10, in accordance with an aspect of the present disclosure, is shown within FIG. 1. Within the shown example, the arrangement 10 includes a plurality of photovoltaic panels 12 and a mount system 14 for supporting the plurality of photovoltaic panels 12 above a ground 16, in accordance with an aspect of the present disclosure.

It is to be appreciated that the term "ground" is to be broadly interpreted to mean earth, possibly with vegetation thereon, and/or man-made structure(s), such as building(s), structure(s) or the like. Various types of combinations of natural and man-made portions are within the scope of the term "ground." As such, the particular type of "ground" is not a limitation upon the present disclosure.

Figure 2:
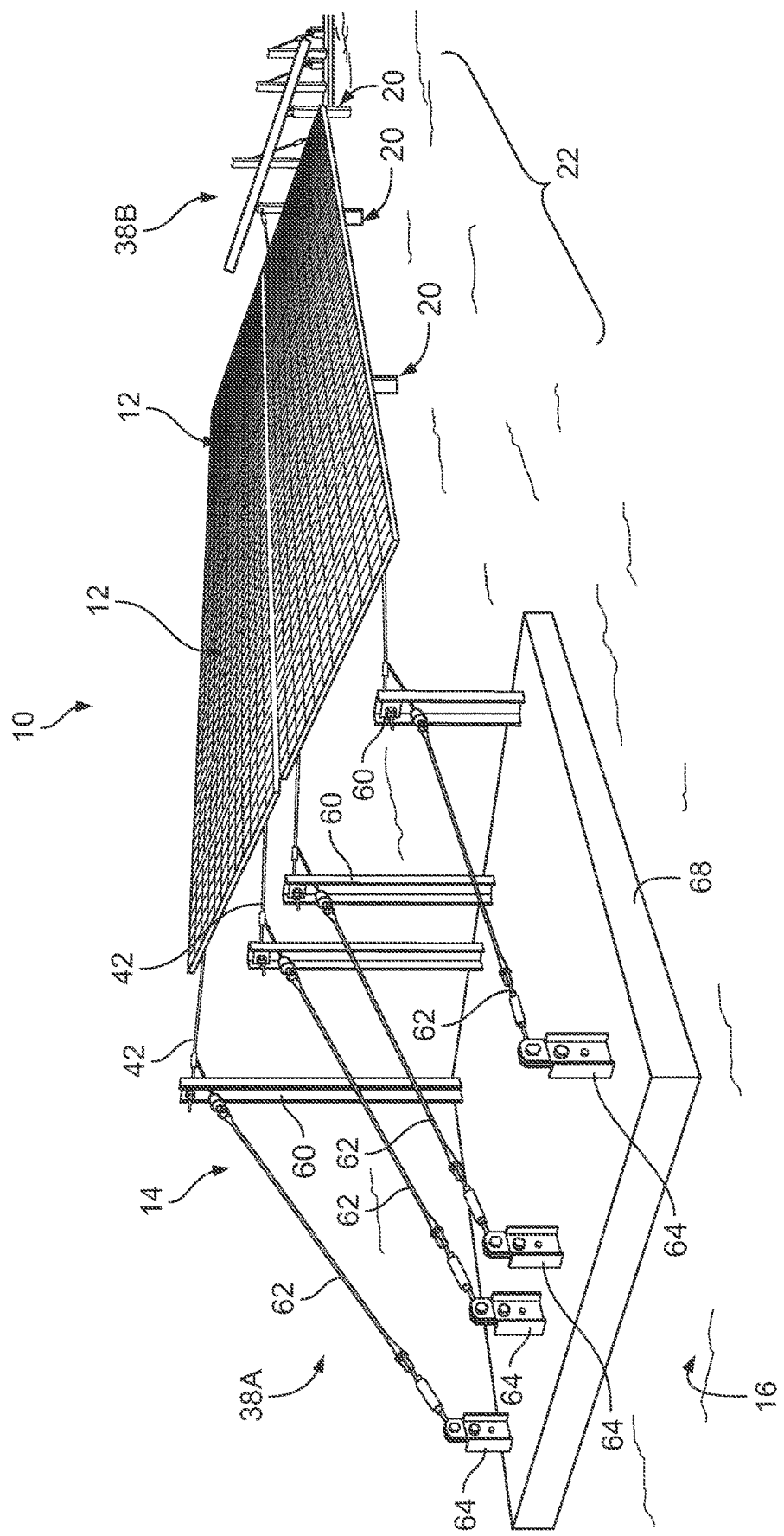
FIG. 2 is a perspective end view of the example photovoltaic panel array system of FIG. 1, with some photovoltaic panels removed at a distal end.
Figure 3:
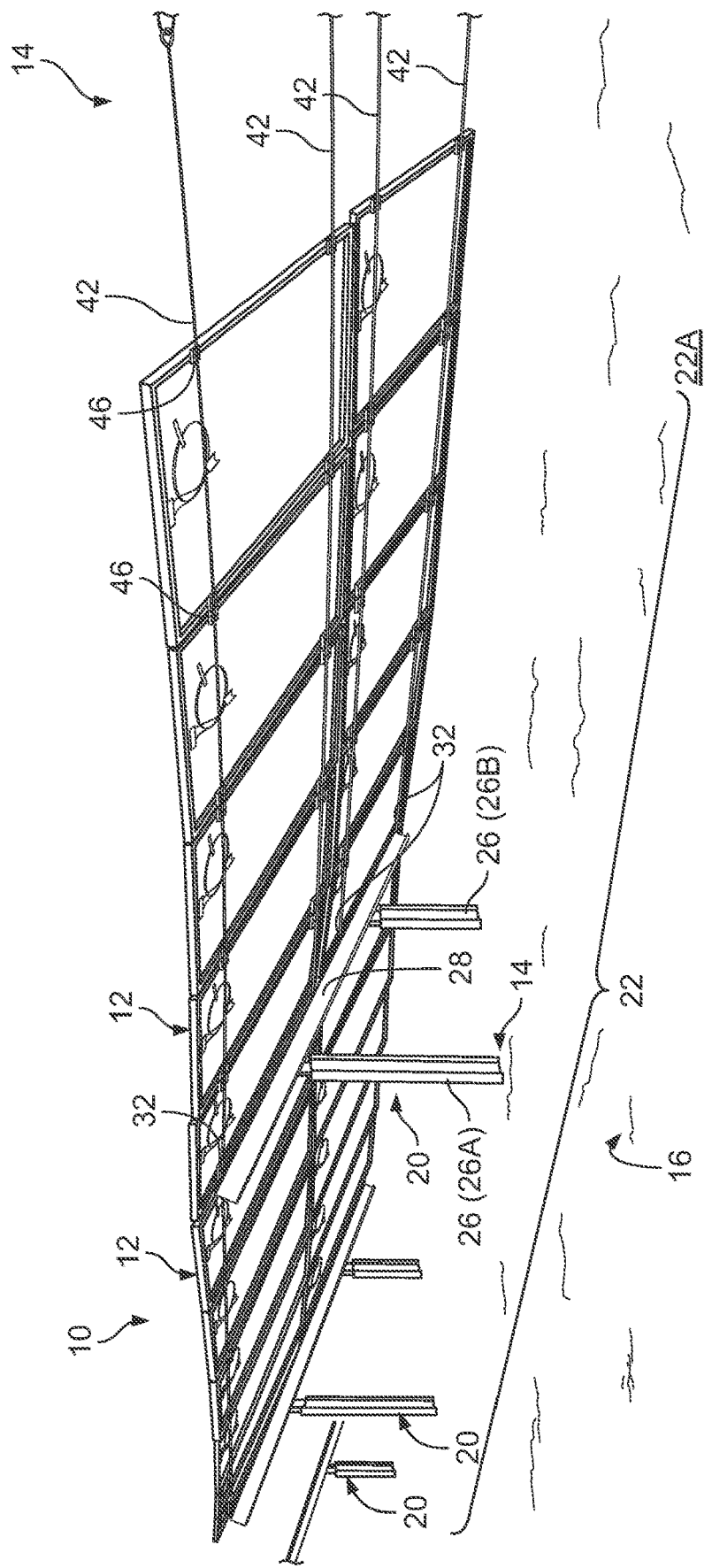
FIG. 3 is a reverse angle perspective view, as compared to FIG. 2, of a portion of the example photovoltaic panel array system as shown in FIG. 2.

Attention is directed to FIGS. 2 and 3, in which a portion of the photovoltaic panels 12 is removed in order to permit viewing of some of the other portions of the arrangement 10 and specifically the mount system 14. As a general overview, the shown example mount system 14 includes a plurality of stanchions 20 (easily seen within FIG. 3). Each of the stanchions 20 is spaced apart from the other of the stanchions 20 in a linear stanchion array 22 having first and second linear stanchion array ends 22A, 22B (easily appreciated from FIG. 1) and with the spacing between each pair of the stanchions 20 permitting multiple photovoltaic panels 12 to be located between the respective pair of the stanchions 20. Each stanchion 20 includes at least one vertical member 26 (easily seen in FIG. 3) extending away from the ground 16.

Each stanchion 20 includes a transverse member 28 supported by the vertical member 26 above the ground 16 and extending transverse to the extent of the vertical member 26. The transverse member 28 has a plurality of support points 32 (easily seen in FIGS. 3 and 4).

The system 14 includes a plurality of anchor arrangements 38 (easily seen in FIG. 1) fixed relative to the ground 16. A first anchor arrangement 38A being located proximate to the first linear stanchion array end 22A and a second anchor arrangement 38B being located proximate to the second stanchions array end 22B.

Figure 6:
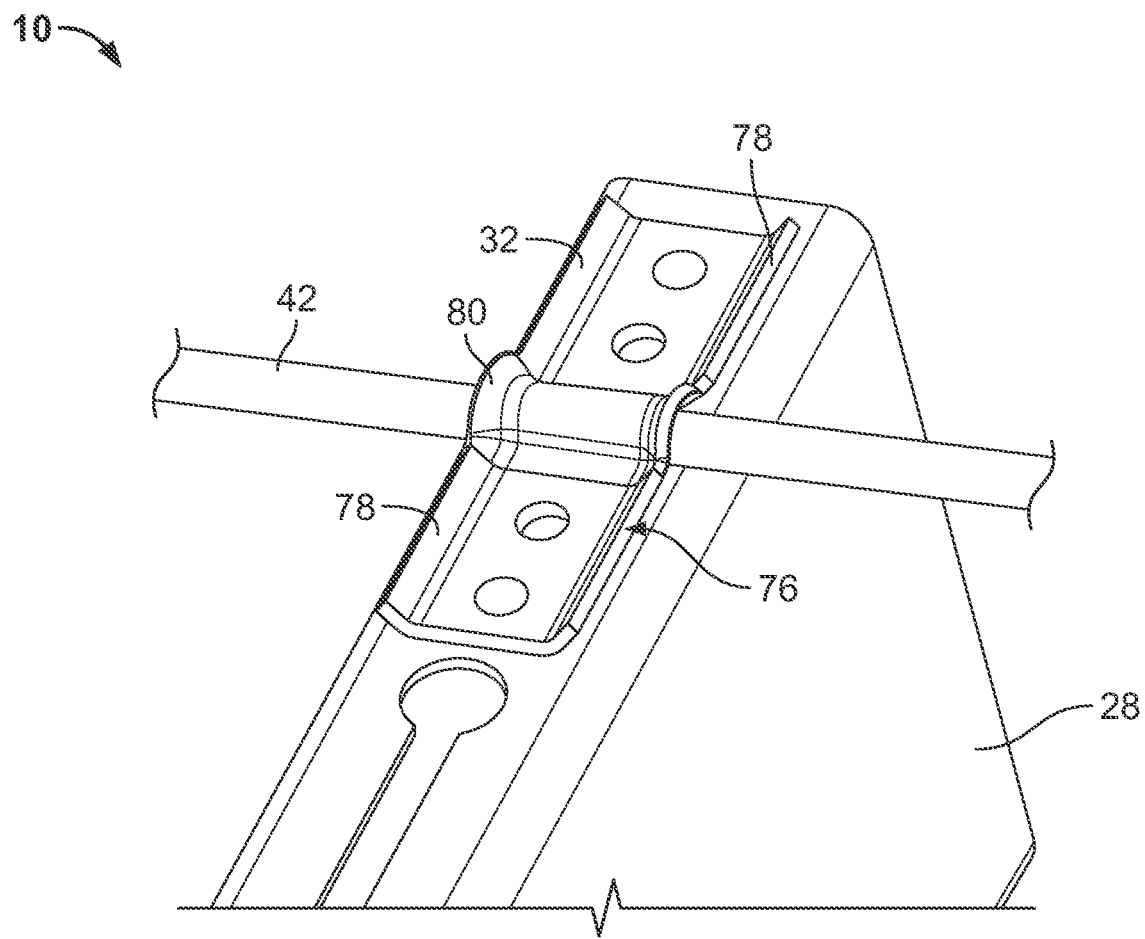
FIG. 6 is a perspective, enlarged view of an example attachment of a cable to an example stanchion transverse member.

The system 14 includes a plurality of cables 42. Each cable 42 is under tension and extends between the first anchor arrangement 38A and the second anchor arrangement 38B. Each of the cables 42 extends to engage a respective support point 32 (easily seen in FIGS. 3 and 4) on the transverse member 28 of each of the plurality of stanchions 20 and is supported by the transverse member of each of the plurality of stanchions. A specific example of the support point 32 on a respective transverse member 28 is shown in FIG. 6, which is discussed further following.

Figure 7:
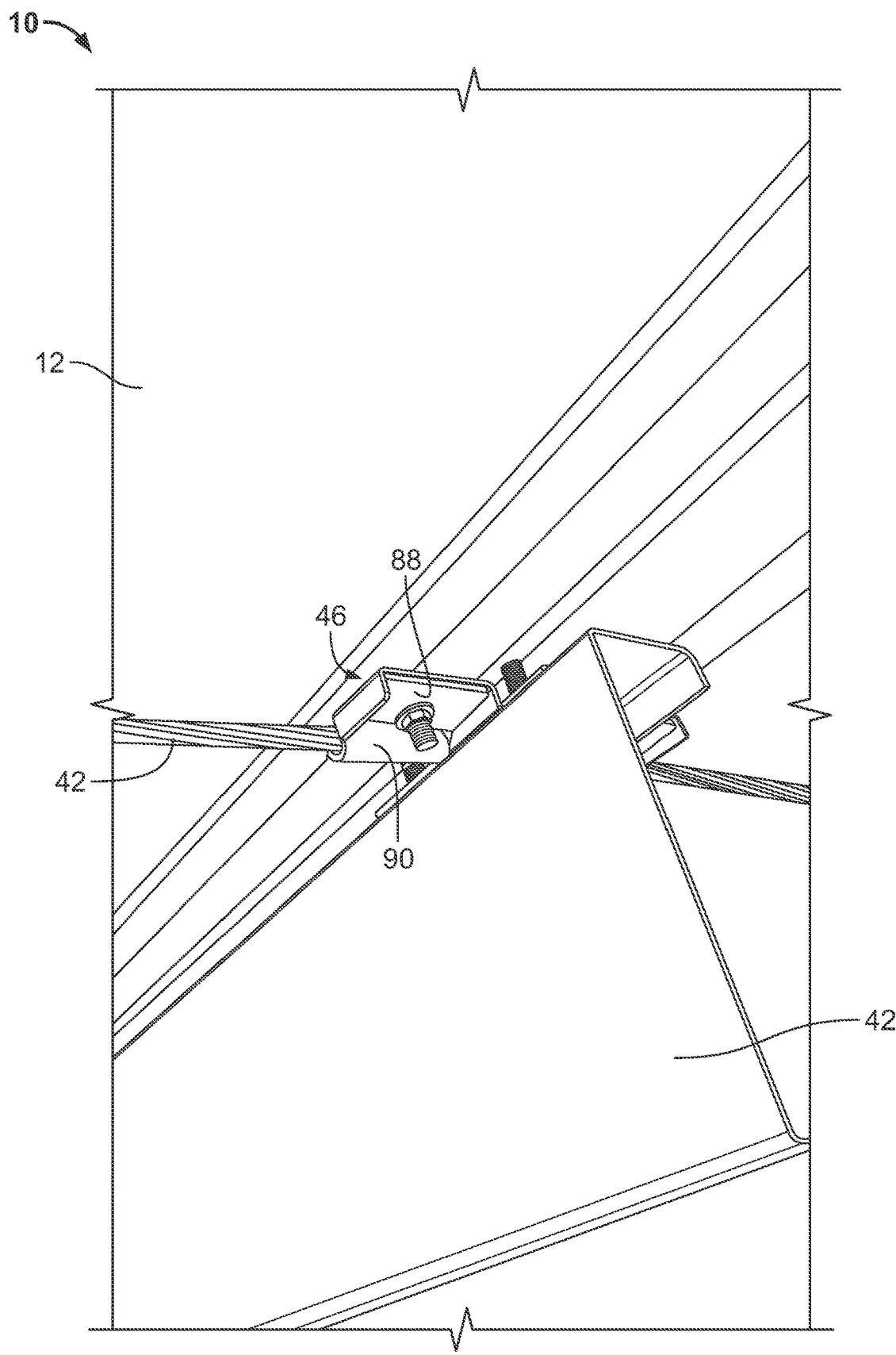
FIG. 7 is a perspective, enlarged view of an example attachment of a cable, via an example photovoltaic panel attachment, to an example photovoltaic panel.

The system 14 includes a plurality of photovoltaic panel attachments 46 (easily seen in FIG. 3). Each photovoltaic panel attachment 46 is secured to a point on a respective one of the photovoltaic panels 12 and secured to a respective one of the cables 42. A multiple of the photovoltaic panel attachments 46 are secured to each photovoltaic panel 12 and the multiple of the photovoltaic panel attachments 46 are distributed to be secured to multiple of the cables 42. Each respective photovoltaic panel 12 is retained within an array of the photovoltaic panels extending along the cables 42. See FIG. 1 for an example array of photovoltaic panels, and note that FIG. 1 shows the full example array as compared to FIGS. 2-4 that have some of the array removed to more easily see other structures. A specific example of the photovoltaic panel attachments 46, secured to one of the photovoltaic panels 12 and secured to a respective one of the cables 42, is shown in FIG. 7, which is discussed further following.

It is to be appreciated that, within the scope of the present disclosure, the above-mentioned structures, components, interactions, etc. may be varied and thus need not be specific limitation(s) upon the present disclosure. With such appreciation and understanding, some further example specifics are presented following.

Turning to the photovoltaic panels 12, such panels may also be referred to as PV panels or solar panels. The photovoltaic panels 12 convert light, and in particular sunlight, into electrical energy. Each photovoltaic panel 12 has a polygonal shape, such as a square or rectangle. Typically, several/many photovoltaic panels 12 are desired to be within the array so as to provide a desired amount of electrical energy. Within the shown example in FIG. 1, there are forty (40) rectangular-shaped photovoltaic panels 12. Twenty (20) are located in each of two (2) rows. Of course, the shapes of the photovoltaic panels 12, the number of photovoltaic panels, and/or the number of rows of photovoltaic panels within the array may be varied. Thus, such specific(s) need not be limitation(s) upon the present disclosure.

Turning to the stanchions 20, within the shown example, three (3) stanchions 20 are present. Of course, the number of stanchions 20 may be varied. As such, the number of stanchions 20 need not be a specific limitation upon the present disclosure. Within some examples, the number of stanchions 20 may related to the number of photovoltaic panels 12 and/or shape/size of photovoltaic panels 12. As mentioned, the stanchions 20 are spaced apart within the linear stanchion array 22 with the spacing to permit multiple photovoltaic panels 12 to be located between the stanchions 20. Within the shown example, the photovoltaic panels 12 are grouped together in groups of ten (10), five (5) in each of the two (2) rows of the shown example. So, within the shown example, the stanchion spacing is associated with the groups of ten (10) photovoltaic panels 12 therebetween/interspersed.

As mentioned, each stanchion 20 (easily seen in FIGS. 3 and 4) includes at least one vertical member 26 extending away from the ground 16. Within one example, the stanchions 20 in general, and thus the vertical members 26, are made of rigid metal, such as steel and/or aluminum. Within an example, the vertical members 26 have a general "I" beam type construction. Of course, other structural/rigid materials and/or constructions may be used, and such variances are within the scope of the present disclosure.

Figure 4:
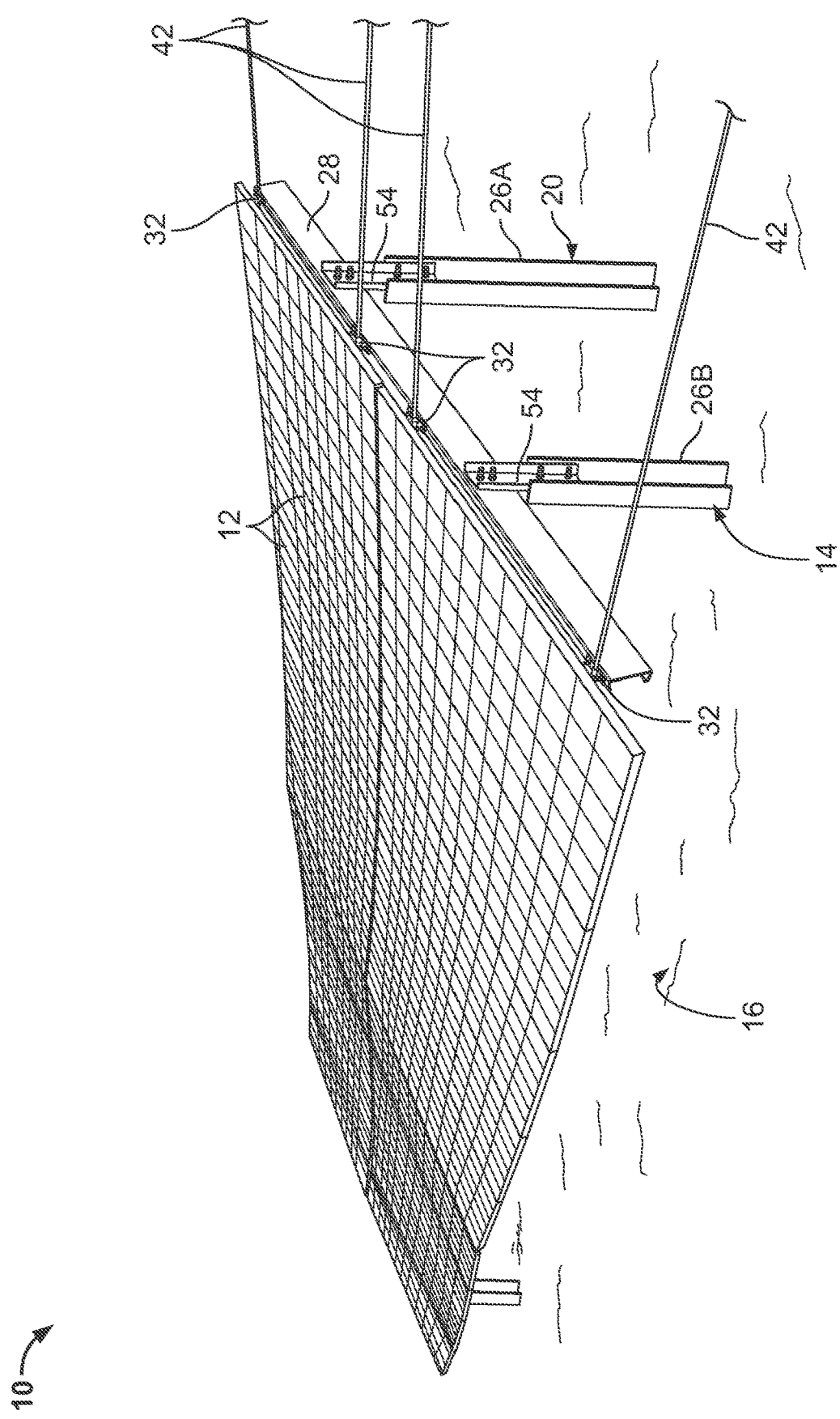
FIG. 4 is a perspective view, from the distal end as compared to FIG. 2, of a portion of the example photovoltaic panel array system as shown in FIG. 2.

Within the shown example, each stanchion 20 includes two (2) vertical members 26 (easily seen in FIGS. 3 and 4). Within the shown example, there is one relatively taller vertical member 26A and is one relatively shorter vertical member 26B. Although multiple vertical member 26 need not be required, multiple vertical members 26 may help enhance stability. Also, it is possible that more than two (2) vertical members 26 may be provided. Such variances may be related to the size, number, arrangement, etc. of photovoltaic panels 12. Of course, such variances are within the scope of the present disclosure.

The vertical members 26, and thus the entirety of the stanchions 20, are rigidly fixed relative to ground 16. Such rigid fixation may be via a variety of constructions, configurations and the like. As one example, attention is directed to the example shown in FIGS. 1-4 (and also the example of FIG. 5) which shows that part of the stanchions 20 may extend down into ground 16. Such ground penetration portion may be via direct-driving into the ground 16, helical auger-type penetration, excavation accompanied by concrete encasement, or the like. Of course, the rigid fixation may dependent upon the type of ground 16. If the ground 16 includes some/all of a manmade structure, such as a building, the fixation may be varied. Such variations are within the scope of the present disclosure.

Turning to the aspect of plural vertical members being of different height (e.g., taller vertical member 26A and shorter vertical member 26B, see for example FIGS. 3 and 4), such variation in height may be associated with a desired angle orientation (e.g., slope) of the photovoltaic panels 12. Such may be useful to help maximize electrical energy output from the photovoltaic panels 12, such as via improving a face-on orientation toward the sun. Of course, other portions of the system 14 and/or other factors may also be utilized to obtain the desired angle orientation (e.g., slope) of the photovoltaic panels 12.

Each stanchion 20 includes at least the transverse member 28 (i.e., at least one transverse member 28). More than one transverse member 28 per each stanchion 20 is possible and within the scope of the present disclosure. The number of transverse members 28 may be related to the size, number, arrangement, etc. of photovoltaic panels 12. As mentioned, within one example, the transverse member 28 of each stanchion 20 is made of a rigid metal, such as steel and/or aluminum. Within the shown example, the shown transverse member 28 (see FIG. 4) has a "C" channel cross-section. Such may help provide a balance of rigidity and material savings. Of course, different materials and/or configurations are contemplated and within the scope of the present disclosure.

The transverse member 28 may be at any desired angle (e.g., slope) relative to the vertical member(s) 26. Also, the transverse member 28 may be at any desired angle (e.g., slope) relative to ground 16. Some example angles (e.g., slopes) between the transverse member 28 and the ground 16 may be 45°, 30°, etc. The angular position of the transverse member 28 may be generally related to the different heights of the two vertical members 26A, 26B. Such variation in desired angle (e.g., slope) of the transverse member 28 may be associated with a desired angle (e.g., slope) orientation of the photovoltaic panels 12. Such may be useful to help maximize electrical energy output from the photovoltaic panels 12.

Within each example stanchion 20, the transverse member 28 is connected to the vertical members 26A, 26B. The connection may be of a variety of constructions/configurations, and as such the specifics of the connection need not be specific limitation upon the present disclosure. Within the shown example, arrangements of connector plates 54 (see FIG. 4), bolts, nuts, etc. provide the connection. As may be appreciated for the shown example, the transverse member 28, the vertical members 26A, 26B and the connector plates 54 have apertures through which the bolts extend. The nuts are tightened to fix the transverse member 28, the vertical members 26A, 26B and the connector plates to be fixed/rigid relative to each other. Within the example, the connection may permit adjustment during installation. Such adjustment ability may be provided via the use of one or more elongate slots as the apertures through the transverse member 28, the vertical members 26A, 26B and/or the connector plates 54. Again, it is to be appreciated that the specifics, such as the elongate slots, need not be specific limitations upon the present disclosure and that variations are possible and within the scope of the present disclosure.

Turning to the two anchor arrangements 38A, 38B (see FIGS. 1 and 2), each anchor arrangement 38, retains a respective end of each of the cables 42. Each cable 42 being under tension between the two anchor arrangements 38A, 38B. Also within the shown example, each anchor arrangement 38 retains a respective end of each of the cables 42 at a height that is commentary, e.g., same or similar, to a height at which the respective cable is supported by the transverse members 28 of the stanchions 20.

It is to be appreciated that the anchor arrangements 38A, 38B may have a variety of constructions/configurations and that such variation is within the scope of the present invention. The shown and discussed examples regarding the anchor arrangements 38A, 38B are merely examples and need not be specific limitations upon the present disclosure.

The shown example anchor arrangements 38A, 38B each includes a plurality of vertical supports 60, a plurality of anchor cables 62 and a plurality of anchor points 64.

Within the example, the vertical supports 60 are rigid and made of metal (e.g., steel or aluminum). Each vertical support 60 is generally located to be aligned along an extent of one of the cables 42 and that vertical support 60 is aligned with the respective support points 32 of the transverse members 28 for that particular cable. Each respective cable 42 extends toward an upper end of the respective vertical support 60. Each respective cable 42 is connected to the upper end of the respective vertical support 60. Within some examples, the connection of the cable 42 to the respective vertical support 60 includes one or more connector, connection arrangements, tensioners or the like. The specifics of the connection of the cable 42 to the respective vertical support 60 may be varied and such variations are within the scope of this disclosure.

The vertical supports 60 are fixed relative to ground 16. Such rigid fixation may be via a variety of constructions, configurations and the like. As one example, attention is directed to FIG. 2 which shows that a part of each vertical support 60 is embedded in a concrete footer 68 that is thus considered to be part of the ground 16. The vertical supports 60 and/or the concrete footer 68 may extend some distance down from a surrounding surface of the ground 16.

Each of the plurality of anchor cables 62 is made of metal or other material of similar strength. Each of the plurality of anchor cables 62 extends at a downward slope from a respective one of the vertical supports 60 to a respective anchor point 64. Each anchor cable 62 is connected to the respective anchor point 64. Each anchor cable 62 being under tension between two anchor arrangements 38. Each anchor cable 62 is connected to the respective vertical support 60 and the respective anchor point 64. With some examples, the connections for the anchor cable 62 includes one or more connectors, connection arrangements, tensioners or the like. The specifics of the connections of the anchor cable 62 may be varied and such variations are within the scope of this disclosure.

Within the example, the anchor points 64 are rigid and made of metal (e.g., steel or aluminum). The anchor points 64 are fixed relative to ground 16. Such rigid fixation may be via a variety of constructions, configurations and the like. As one example, attention is directed to FIG. 2 which shows that a part of each anchor point 64 is embedded in the concrete footer 68 that is thus considered to be part of the ground 16. The anchor points 64 and/or the concrete footer 68 may extend some distance down from a surrounding surface of the ground 16. Of course, the rigid fixation may dependent upon the type of ground 16. If the ground 16 includes some/all of a manmade structure, such as a building, the fixation may be varied. Such variations are within the scope of the present disclosure.

Of course, a different fixation relative to ground 16 may be provided. As an example of such other fixation, attention is directed to FIG. 5. Within FIG. 5, a portion of another example arrangement 10' is a schematic shown. The section view extends into a portion of ground 16. It is to be noted that some portions of the arrangement 10' that may be similar to portions as described for the arrangement 10 (FIGS. 1-4) are identified within FIG. 5 with the same numerals, but with the addition of "'" (prime).

Focusing upon the portions that provide a different fixation relative to ground for an anchor arrangement 38' the following is to be noted as one example. At least one ground penetrating structure 72 is affixed to the vertical supports 60' and extending down into the ground 16. Such ground penetration may be via direct-driving of a member into the ground 16, helical auger-type penetration, excavation accompanied by concrete encasement, or the like. Of course, the rigid fixation may dependent upon the type of ground 16. If the ground 16 includes some/all of a manmade structure, such as a building, the fixation may be varied. Such variations are within the scope of the present disclosure.

Figure 5:
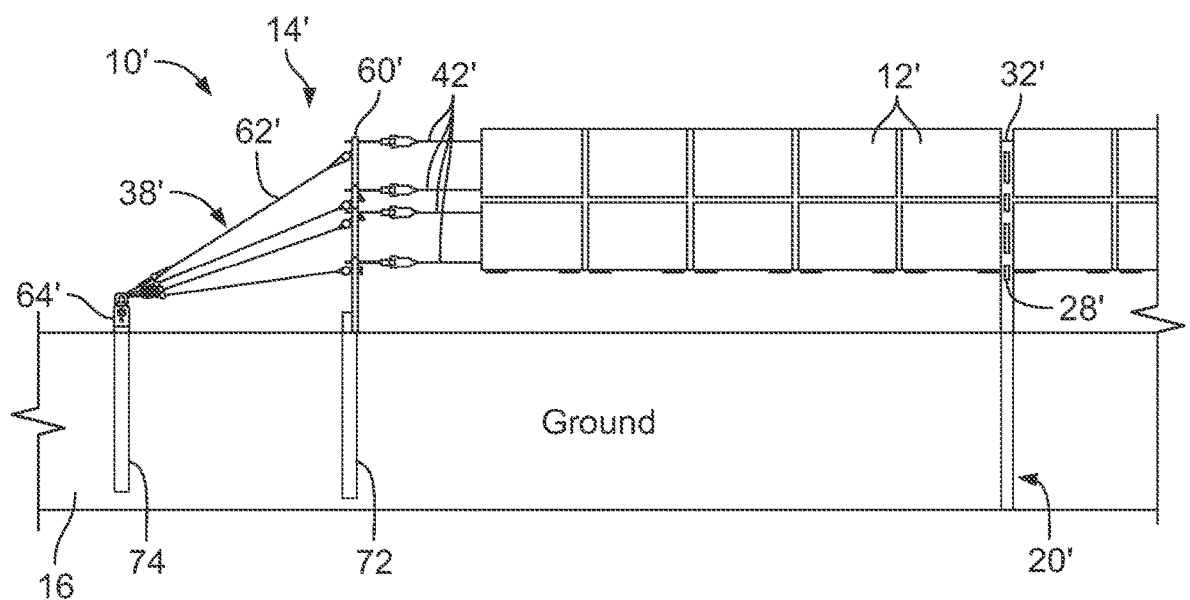
FIG. 5 is a schematic section view of a portion of another example system, similar to the example system of FIG. 1 and in accordance with the present disclosure, with the section for the view extending into a portion of ground.

Also within the example of FIG. 5, at least one ground penetrating structure 74 is affixed to the anchor point 64' and extending down into the ground 16. Such ground penetration may be via direct-driving of a member into the ground 16, helical auger-type penetration, excavation accompanied by concrete encasement, or the like. Of course, the rigid fixation may dependent upon the type of ground 16. If the ground 16 includes some/all of a manmade structure, such as a building, the fixation may be varied. Such variations are within the scope of the present disclosure.

Turning now to the cables 42 (e.g., FIGS. 1-4), such may also be referred to as strands, or similar. The cables 42 are made of metal or other material of similar strength. As mentioned, each cable 42 is under tension and extends between the first anchor arrangement 38A and the second anchor arrangement 38B. As such, each cable extends generally in a straight line. Of course, some minor deviation/deflection may be present. It is to be noted that the amount of tension within each cable may be related to the amount of deviation/deflection that may be present. Generally, greater tension helps reduce the amount of deviation/deflection that may be present.

The support points 32 on the transverse members 28 provide support to and help retain the cables 42. The support points 32 may have any of a variety of constructions/configurations and accordingly such variety is within the scope of the present disclosure. It is to be appreciated that some example support points 32 may have constructions/configurations that include no or minimal structures beyond the construction/configuration of the overall respective transverse member 28. As a specific example of such, a simple through hole through the transverse member 28 may be the respective support point 32. Also, is to be appreciated that some example support points 32 may have constructions/configurations that include some/many structures beyond the construction/configuration of the overall respective transverse member 28. Still further, the locations of the support points 32 on the respective transverse member 28 may be varied (e.g., top side, bottom side, through the respective transverse member 28). For this disclosure, all of such variations are simply indicated and understood to be "on" the respective transverse member 28.

Within the shown example, there are four support points on the transverse member 28 of each stanchion 20 (see FIGS. 3 and 4). FIG. 6 shows details of one example support point 32. Specifically, the example support point 32 includes a portion of the transverse member 28 to which an example bracket 76 is secured. The bracket 76 is made of metal (e.g., steel or aluminum) or material of similar strength. The bracket 76 includes two flange portions 78 that are secured, such as by bolts, screws, rivets or the like, to the portion of the transverse member 28. A saddle portion 80 of the bracket 76 is located between the two flange portions 78. The saddle portion 80 is raised above the portion of the transverse member 28 to permit the respective cable 42 to extend therethrough. Thus, the cable 42 is trapped between the bracket 76 and the portion of the transverse member 28. It is to be noted that within some examples there may be structures (e.g., elongate slots) that permit some easy adjustment(s) of the location(s) of the support points 32 (e.g., including brackets 76) on the transverse member 28. Accordingly, such is within the present disclosure.

It is to be noted that, with the cables 42 being under tension and with the cables 42 being supported on the transverse members 28 of the stanchions 20, an effective and efficient structure for supporting the photovoltaic panels 12 is provided.

It is to be noted that the provision of the mount system 14, which includes the cables 42, is to be considered as being efficient in terms of cost and time investment as compared to another mount system that does not include the use of cables (e.g., a mount system that only has construction using rigid components). Within the shown example mount system 14, only cables 42 extend between the anchor arrangements 38 and/or the stanchions 22.

Turning now to the photovoltaic panel attachments 46 (see FIG. 3), such may have any of a variety of constructions/configurations and accordingly such variety is within the scope of the present disclosure. It is to be appreciated that there may be different types (e.g., different constructions/configurations) of photovoltaic panel attachments 46 within the mount system 14. As mentioned, each photovoltaic panel attachment 46 is secured to a point on a respective one of the photovoltaic panels 12 and secured to a respective one of the cables 42.

As an example of photovoltaic panel attachment 46, attention is directed to FIG. 7. Within the shown example, the photovoltaic panel attachment 46 includes a bracket portion 88, which is secured to the respective photovoltaic panel 12 (e.g., at a frame or similar of the photovoltaic panel) via a fastener (e.g., bolt and nut, screw, rivet or the like). Also, the photovoltaic panel attachment 46 includes a saddle portion 90 at one end of the bracket portion 88. The respective cable 42 extends through and is held by the saddle portion 90. Of structure(s) that permit adjustment are contemplated and thus within the present disclosure.

Accordingly, the photovoltaic panels 12 are held within the array of photovoltaic panels via the mount system 14, which is efficiently provided in terms of cost and time investment. As such, the overall photovoltaic panel array arrangement 10 is effect and efficient in terms of cost and time investment.

Within the shown example (FIGS. 1-4), two cables 42 are provided for each row of photovoltaic panels 12 within the array of photovoltaic panels. So, the number of cables 42 within an overall arrangement 10 may be twice the number of rows of photovoltaic panels 12 within the array of photovoltaic panels. So, within the shown example, there are two rows of photovoltaic panels 12 within the array of photovoltaic panels and thus there are four cables 42. Of course, a different number of cables 42 per each row of photovoltaic panels 12 within the array of photovoltaic panels is contemplated and within the scope of the present disclosure.

Within the shown example (FIGS. 1-4), four photovoltaic panel attachments 46 are provided for each photovoltaic panel 12. Two photovoltaic panel attachments 46 connect the respective photovoltaic panel 12 to a first one of the cables 42 and a different two photovoltaic panel attachments 46 connect the respective photovoltaic panel 12 to a second, different one of the cables 42. Of course, a different number of photovoltaic panel attachments 46 per photovoltaic panel 12 is contemplated and within the scope of the present disclosure.

Of course, methods of making the photovoltaic panel array arrangement (e.g., 10) and/or the mount system (e.g., 14), and portions thereof, and methods of utilizing the photovoltaic panel array arrangement and/or the mount system, and portions thereof, are contemplated and within the scope of the present disclosure.

The example claims following present various example aspects. The contents of the claims are incorporated herein at into this specification by reference.

The accompanying drawings present various example aspects. The contents of the drawings are incorporated herein at into this specification by reference.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or." In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes," "having," "has," "with," and/or variants thereof are used in either the detailed description or the claims, such terms are intended to be inclusive in a manner similar to the term "comprising."

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described herein should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above-described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed:

1. A mount system for a supporting a plurality of photovoltaic panels above a ground, the mount system comprising:
   a plurality of stanchions, each stanchion of the plurality of stanchions being spaced apart from other stanchions of the plurality of stanchions in a linear stanchion array having a first linear stanchion array end and a second linear stanchion array end and with spacing between a pair of stanchions of the plurality of stanchions permitting multiple photovoltaic panels of the plurality of photovoltaic panels to be located between the pair of the stanchions, each stanchion comprising:
      a vertical member extending away from the ground; and
      a transverse member supported by the vertical member above the ground and extending non-parallel to an extent of the vertical member, the transverse member having a plurality of support points;
   a plurality of anchor arrangements fixed relative to the ground, a first anchor arrangement of the plurality of anchor arrangements being located proximate to the first linear stanchion array end and a second anchor arrangement of the plurality of anchor arrangements being located proximate to the second linear stanchion array end;
   a plurality of cables, each cable of the plurality of cables being under tension and extending between the first anchor arrangement and the second anchor arrangement, a cable of the plurality of cables extending to engage a support point of the plurality of support points on the transverse member of a stanchion of the plurality of stanchions and being supported by the transverse member of the stanchion of the plurality of stanchions; and
   a plurality of photovoltaic panel attachments, a first photovoltaic panel attachment of the plurality of photovoltaic panel attachments secured to a first photovoltaic panel of the plurality of photovoltaic panels and secured to a first cable of the plurality of cables and a second photovoltaic panel attachment of the plurality of photovoltaic panel attachments secured to the first photovoltaic panel of the plurality of photovoltaic panels and secured to a second cable of the plurality of cables to support the first photovoltaic panel within an array of photovoltaic panels supported by the plurality of cables.

2. The system as set forth in claim 1, wherein the ground comprises at least one of earth or a man-made structure.

3. The system as set forth in claim 1, wherein the ground comprises earth.

4. The system as set forth in claim 1, wherein the array of photovoltaic panels has a number of rows of photovoltaic panels, and a number of cables of the plurality of cables is equal to twice the number of rows of photovoltaic panels in the array.

5. The system as set forth in claim 1, wherein at least four photovoltaic panel attachments of the plurality of photovoltaic panel attachments are secured to the first photovoltaic panel.

6. The system as set forth in claim 1, wherein the vertical member of each stanchion is a first vertical member, and each stanchion comprises a second vertical member extending away from the ground.

7. The system as set forth in claim 6, wherein the first vertical member and the second vertical member of each stanchion have a different height extent away from the ground.

8. The system as set forth in claim 1, wherein the transverse member is sloped relative to the ground.

9. The system as set forth in claim 1, wherein the transverse member is sloped relative to the vertical member.

10. The system as set forth in claim 1, wherein only the plurality of cables extend between the stanchions.

11. A photovoltaic panel array arrangement comprising:
a plurality of photovoltaic panels; and
a mount system for a supporting the plurality of photovoltaic panels above a ground, the mount system comprising:
a plurality of stanchions, each stanchion of the plurality of stanchions being spaced apart from other stanchions of the plurality of stanchions in a linear stanchion array having a first linear stanchion array end and a second linear stanchion array end and with spacing between a pair of stanchions of the plurality of stanchions permitting multiple photovoltaic panels of the plurality of photovoltaic panels to be located between the pair of the stanchions, each stanchion comprising:
a vertical member extending away from the ground; and
a transverse member supported by the vertical member above the ground and extending non-parallel to an extent of the vertical member, the transverse member having a plurality of support points;
a plurality of anchor arrangements fixed relative to the ground, a first anchor arrangement of the plurality of anchor arrangements being located proximate to the first linear stanchion array end and a second anchor arrangement of the plurality of anchor arrangements being located proximate to the second linear stanchion array end;
a plurality of cables, each cable of the plurality of cables being under tension and extending between the first anchor arrangement and the second anchor arrangement, a cable of the plurality of cables extending to engage a support point of the plurality of support points on the transverse member of a stanchion of the plurality of stanchions and being supported by the transverse member of the stanchion of the plurality of stanchions; and
a plurality of photovoltaic panel attachments, a first photovoltaic panel attachment of the plurality of photovoltaic panel attachments secured to a first photovoltaic panel of the plurality of photovoltaic panels and secured to a first cable of the plurality of cables and a second photovoltaic panel attachment of the plurality of photovoltaic panel attachments secured to the first photovoltaic panel of the plurality of photovoltaic panels and secured to a second cable of the plurality of cables to support the first photovoltaic panel within an array of photovoltaic panels supported by the plurality of cables.

12. The arrangement as set forth in claim 11, wherein the ground comprises at least one of earth or a man-made structure.

13. The arrangement as set forth in claim 11, wherein the ground comprises earth.

14. The arrangement as set forth in claim 11, wherein the array of photovoltaic panels has a number of rows of photovoltaic panels and a number of cables of the plurality of cables is equal to twice the number of rows of photovoltaic panels in the array.

15. The arrangement as set forth in claim 11, wherein at least four photovoltaic panel attachments of the plurality of photovoltaic panel attachments are secured to the first photovoltaic panel.

16. The arrangement as set forth in claim 11, wherein the vertical member of each stanchion is a first vertical member, and each stanchion comprises a second vertical member extending away from the ground.

17. The arrangement as set forth in claim 16, wherein the first vertical member and the second vertical member of each stanchion have a different height extent away from the ground.

18. The arrangement as set forth in claim 11, wherein the transverse member is sloped relative to the ground.

19. The arrangement as set forth in claim 11, wherein the transverse member is sloped relative to the vertical member.

20. A method for a supporting a plurality of photovoltaic panels above a ground, the method comprising:
providing a plurality of stanchions with each stanchion of the plurality of stanchions being spaced apart from other stanchions of the plurality of stanchions in a linear stanchion array having a first linear stanchion array end and a second linear stanchion array end and with spacing between a pair of stanchions of the plurality of stanchions permitting multiple photovoltaic panels of the plurality of photovoltaic panels to be located between the pair of the stanchions;
providing each stanchion to include a vertical member extending away from the ground, and a transverse member supported by the vertical member above the ground and extending non-parallel to an extent of the vertical member, with the transverse member having a plurality of support points;
providing a plurality of anchor arrangements fixed relative to the ground with a first anchor arrangement of the plurality of anchor arrangements being located proximate to the first linear stanchion array end and a second anchor arrangement of the plurality of anchor arrangements being located proximate to the second linear stanchion array end;
providing a plurality of cables with each cable of the plurality of cables being under tension and extending between the first anchor arrangement and the second anchor arrangement, and with a cable of the plurality of cables extending to engage a support point of the plurality of support points on the transverse member of a stanchion of the plurality of stanchions and being supported by the transverse member of the stanchion of the plurality of stanchions; and providing a plurality of photovoltaic panel attachments with a first photovoltaic panel attachment of the plurality of photovoltaic panel attachments secured to a first photovoltaic panel of the plurality of photovoltaic panels and secured to a first cable of the plurality of cables and a second photovoltaic panel attachment of the plurality of photovoltaic panel attachments secured to the first photovoltaic panel of the plurality of photovoltaic panels and secured to a second cable of the plurality of cables to support the first photovoltaic panel within an array of photovoltaic panels supported by the plurality of cables.

\* \* \* \* \*